Patented Nov. 21, 1939

2,180,835

UNITED STATES PATENT OFFICE 2,180,835

BROMINATION OF BENZANTHRONE

Melvin Alfred Perkins, Wilmington, Del., and Joseph Deinet, Glassboro, N. J., assignors to E. I. du Pont de Nemours & Company, Wilmington, Del., a corporation of Delaware No Drawing. Application June 21, 1938,
Serial No. 214,966

4 Claims. (Cl. 260—364)

This invention relates to the preparation of bromobenzanthrone compounds, and has for its object to provide an improved process for preparing Bz-1-bromobenzanthrone and 6,Bz-1-dibromobenzanthrone of high purity and in high yields.

Bz-1-bromobenzanthrone has heretofore been prepared by direct bromination in water or in glacial acetic acid, but these processes give a very impure product which can not be purified successfully without extraordinarily high loss in yield of the Bz-1-bromobenzanthrone. Bromination in water and in glacial acetic acid results in over bromination of part of the benzanthrone and the higher bromination products cannot be removed completely by recrystallization even from acetic acid. The glacial acid bromination is also impractical for commercial use since at one stage in the reaction the mass becomes solid, and a long period of time is required to bring the reaction to completion. The 6,Bz-1-dibromobenzanthrone is likewise difficult to prepare, the most successful method to date being one in which the benzanthrone is suspended in liquid bromine. This process is expensive, as well as unnecessarily hazardous, and it requires recrystallization of the product to give dibromobenzanthrone of a purity necessary for most uses.

We have found that benzanthrone can be brominated to the mono-, or dibromo-derivative readily and in a highly satisfactory manner when the benzanthrone is suspended in an inert organic solvent, such as nitrobenzene, nitrotoluene, chlorinated benzenes, etc., and treated with bromine in the presence of sulfuryl chloride, the bromine being used in amounts equal to or slightly in excess of that theoretically required to give the desired bromo-compound. A bromination catalyst, such as iodine, may be employed to speed up the reaction, although its use is not essential for the production of the mono- or dibromobenzanthrones in high yield or of high quality. The amount of bromine can be varied from that theoretically required (1 atom per mol for mono-bromination or 2 atoms per mol for dibromination) to approximately 15% in excess of theory. The use of less causes a rapid decrease in the yields, while the use of more than 15% of theory tends to give overbromination.

In the preparation of the Bz-1-bromobenzanthrone, the sulfuryl chloride is preferably used with the bromine in a molar ratio of 1:1. Less sulfuryl chloride causes a marked decrease in yield, while the use of larger amounts tends to introduce chlorine into the molecule. In the preparation of the 6,Bz-1-dibromobenzanthrone a larger excess of sulfuryl chloride may be used, and is preferred, since it is difficult to introduce more than two atoms of halogen into the benzanthrone molecule, and the use of larger amounts of sulfuryl chloride increases the yields of 6,Bz-1-dibromobenzanthrone. The bromine may be added to the organic solvent suspension of the benzanthrone, after which the sulfuryl chloride may be added; or they may be added as a uniform mixture (admixed with iodine if desired).

The following examples are given to illustrate the invention more fully. The parts used are by weight.

Example 1

A mixture of 100 parts of benzanthrone (pure) and 200 parts of dry nitrobenzene is heated to 130 to 140° C. to effect complete solution. Under agitation, the mass is cooled to 90° C., whereupon much of the benzanthrone crystallizes out. At this point, the apparatus is sealed except for a long air condenser, and 1 part of iodine is added. With the temperature adjusted at 80 to 90° C., a mixture of 38.25 parts of bromine and 32.25 parts of sulfuryl chloride is added dropwise over a period of 4 hours and the mixture stirred for 6 hours longer at 80 to 90° C. It is then cooled to about 8° C. for a short time and is filtered by suction to obtain a very dense cake. This solvent cake is steamed free from solvent and the resulting bromo-compound isolated by filtration. It is Bz-1-bromobenzanthrone containing only traces of chlorine. The purity is attested by a melting range of 170 to 171.8° C. and a crystallizing point of about 170° C.

By using the nitrobenzene filtrate in place of fresh nitrobenzene in the above example, the yield of Bz-1-bromobenzanthrone may be brought as high as 95% of theory with only slight effect upon quality of product.

Example 2

To a dehydrated mixture of 100 parts of benzanthrone and 1000 parts of nitrobenzene, containing 1 part of iodine, there is added, at 80 to 90° C., a mixture of 38 parts of bromine and 32 parts of sulfuryl chloride at such a rate that the rate of addition is roughly proportional to the amount of unchanged benzanthrone present in the mixture, the entire addition requiring 12 to 16 hours. After another 8 hours at 80 to 90° C., sodium carbonate is added to neutralize any halogen acid present and the entire bromination mass is steam distilled free of nitrobenzene. The yield of Bz-1-bromobenzanthrone (crystallizing point 168° C.) is essentially that required by theory.

*Example 3*

To a solution of 1 part of iodine in 600 parts of nitrobenzene, 100 parts of benzanthrone (solvent recrystallized) is added under agitation. 80 parts of bromine are added to the suspension, after which the mixture is stirred for 2 hours at ambient temperature. 135 parts of sulfuryl chloride are then added and the mixture stirred for 18 hours before being gradually warmed to 55° C. It is held for 2 hours at 55° C. to complete the bromination, cooled to 20 to 25° C. and filtered. The cake, containing substantially pure 6,Bz-1-dibromobenzanthrone, can be worked up by steaming or by washing with alcohol and drying. The filtrate contains the more soluble impurities consisting, for the most part, of an isomeric dibromobenzanthrone.

The temperature at which the reaction is carried out may vary widely so long as the mass remains fluid and stirrable throughout and no loss is caused by rapid vaporization. The time of addition of the bromine and sulfuryl chloride may also be varied widely, a longer time being preferred where the bromine and sulfuryl chloride are added as a mixture. After all of the reactants have been added, the optimum reaction period will depend upon the temperature used, and may vary from 1 to 24 hours.

In working up the bromination products, the entire mass can be steam distilled, with or without neutralization or aeration. Alternatively, it can be chilled and filtered, the cake being steamed or washed with a volatile solvent and dried. The mass may be diluted with alcohol before chilling and filtering, or it may be neutralized with sodium carbonate prior to filtering.

In this reaction, the theoretical amount of bromine required is 1 atom per mol of benzanthrone for monobromination, and 1 mol of bromine per mol of benzanthrone for dibromination, the sulfuryl chloride besides exerting a very desirable directing influence also acting as an oxidizing agent to liberate bromine from the HBr which is theoretically formed during the course of the reaction.

Substituted benzanthrones which have the Bz-1-position free may be brominated by this procedure, such as 2-methylbenzanthrone, 6,methylbenzanthrone, etc.

We claim:
1. The process for preparing bromobenzanthrones which comprises reacting benzanthrone in an inert organic solvent with sufficient bromine to give the desired degree of bromination, the bromination being carried out in the presence of an amount of sulfuryl chloride molecularly equivalent to the bromine employed.

2. The process for preparing bromobenzanthrones which comprises reacting benzanthrone in an inert organic solvent, with sufficient bromine to give the desired degree of bromination, the bromination being carried out in the presence of an amount of sulfuryl chloride molecularly equivalent to the bromine employed, and a halogen-substitution catalyst.

3. The process for preparing Bz-1-bromobenzanthrone which comprises reacting benzanthrone suspended in an inert organic solvent with bromine, and sulfuryl chloride, the bromine and sulfuryl chloride being employed in substantially the ratio of 1 atom of bromine and 1 mol of sulfuryl chloride to 1 mol of benzanthrone.

4. The process for preparing Bz-1-bromobenzanthrone which comprises reacting benzanthrone suspended in an inert organic solvent with bromine, and sulfuryl chloride, the bromine and sulfuryl chloride being employed in substantially the ratio of 1 atom of bromine and 1 mol of sulfuryl chloride to 1 mol of benzanthrone, said reaction being carried out in the presence of iodine as a catalyst.

MELVIN ALFRED PERKINS.
JOSEPH DEINET.